United States Patent
Su

(10) Patent No.: US 10,491,627 B1
(45) Date of Patent: Nov. 26, 2019

(54) ADVANCED MALWARE DETECTION USING SIMILARITY ANALYSIS

(71) Applicant: FireEye, Inc., Milpitas, CA (US)

(72) Inventor: Jimmy Zhigang Su, Cupertino, CA (US)

(73) Assignee: FireEye, Inc., Milpitas, CA (US)

( * ) Notice: Subject to any disclaimer, the term of this patent is extended or adjusted under 35 U.S.C. 154(b) by 116 days.

(21) Appl. No.: 15/280,854

(22) Filed: Sep. 29, 2016

(51) Int. Cl.
*G06F 12/16* (2006.01)
*H04L 29/06* (2006.01)

(52) U.S. Cl.
CPC ................ *H04L 63/145* (2013.01)

(58) Field of Classification Search
CPC ... H04L 63/14; H04L 63/145; H04L 63/1433; H04L 63/20; G06F 21/564; G06F 21/566; G06F 21/577; G06F 21/54
See application file for complete search history.

(56) References Cited

U.S. PATENT DOCUMENTS

| | | | |
|---|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07. sub.—mining.pdf-.

(Continued)

*Primary Examiner* — Farid Homayounmehr
*Assistant Examiner* — Lizbeth Torres-Diaz
(74) *Attorney, Agent, or Firm* — Rutan & Tucker, LLP

(57) ABSTRACT

A non-computerized method for detection of malware is described. First, an object for analysis is received. Thereafter, the content from the object is extracted and the extracted content is arranged into one or more basic blocks. Each basic block including at least a portion of the content. The object fingerprint is based on an analysis of the one or more basic blocks. Thereafter, the object fingerprint is generated based on an analysis of the one or more basic blocks. Lastly, the object fingerprint is compared to one or more malware family fingerprints to determine if the object is potentially malicious and may be associated with an advanced malware.

40 Claims, 8 Drawing Sheets

(56) References Cited

U.S. PATENT DOCUMENTS

| | | |
|---|---|---|
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |

(56) References Cited

U.S. PATENT DOCUMENTS

| | | |
|---|---|---|
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 * | 3/2016 | Mesdaq ............... H04L 63/145 |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |

(56) References Cited

U.S. PATENT DOCUMENTS

| | | |
|---|---|---|
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 * | 1/2019 | Abbasi .................. G06F 21/561 |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |

(56) References Cited

U.S. PATENT DOCUMENTS

| | | |
|---|---|---|
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0210364 A1* | 8/2009 | Adi .................. G06N 5/025 706/12 |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1* | 3/2011 | Manni .................. G06F 21/566 726/23 |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |

(56) References Cited

U.S. PATENT DOCUMENTS

| | | |
|---|---|---|
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282630 A1* | 10/2013 | Attenberg ............ G06N 20/00 706/12 |
| 2013/0290263 A1* | 10/2013 | Beaverson ........ G06F 17/30097 707/649 |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0165203 A1* | 6/2014 | Friedrichs ............ G06F 21/56 726/24 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0269495 A1* | 9/2015 | Dalessandro ............ G06N 5/02 706/12 |
| 2015/0286821 A1* | 10/2015 | Ghose ............... G06F 9/3877 713/187 |
| 2015/0326585 A1* | 11/2015 | Topan ................ G06F 21/563 726/24 |
| 2015/0372980 A1 | 12/2015 | Eyada |
| 2015/0381637 A1* | 12/2015 | Raff ................. H04L 63/0218 726/23 |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0076090 A1* | 3/2017 | Horne ................. G06F 11/3624 |
| 2017/0083703 A1 | 3/2017 | Abbasi et al. |
| 2017/0098074 A1* | 4/2017 | Okano ................. G06F 21/567 |
| 2017/0300691 A1* | 10/2017 | Upchurch ............ G06F 21/563 |
| 2018/0013770 A1 | 1/2018 | Ismael |
| 2018/0013772 A1* | 1/2018 | Schmidtler ......... H04L 63/1416 |
| 2018/0048660 A1 | 2/2018 | Paithane et al. |
| 2018/0121316 A1 | 5/2018 | Ismael et al. |
| 2018/0183815 A1* | 6/2018 | Enfinger ............... G06N 20/00 |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe-r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

(56) References Cited

OTHER PUBLICATIONS

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, "Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

ADVANCED MALWARE DETECTION USING SIMILARITY ANALYSIS

FIELD

Embodiments of the disclosure relate to the field of cyber security. More specifically, embodiments of the disclosure relate to a system and method for detecting advanced malware, including zero-day malware, through analysis of data associated with an object and generation of a fingerprint for comparison with fingerprints associated with one or more malware families.

GENERAL BACKGROUND

Over the last decade, cybersecurity attacks have become a pervasive problem for internet users as many networked devices and other resources have been subjected to attack and compromised. The attack may involve the infiltration of malicious software onto a network device or concentration on an exploit residing within a network device to perpetrate the cybersecurity attack (generally referred to as "malware"). In most situations, malware is a program or file that is embedded within downloadable content and designed to allow or directly influence, undermine, disrupt, alter or otherwise attack normal operations of a network device. Examples of different types of malware may include bots, computer viruses, worms, Trojan horses, spyware, adware, or any other programming that operates within an electronic device without permission by a user of the electronic device or a network administrator responsible for protecting an enterprise network with which the electronic device is in communication. In some cases, the attack is designed to exploit a previously unknown vulnerability within software executing on a targeted network device.

Malware may be distributed through a variety of different attack vectors. For example, malware may be installed on a network device through activation of a uniform resource locator (URL), which redirects the user to unknowingly download content from a malicious web site for installation on his or her computer. Similarly, malware may also be installed on a network device upon receipt or opening of an electronic mail (email) message or an attachment with embedded executable malware (e.g., an infected document such as a Portable Document Format "PDF" or word processing document, an infected image, etc.). As yet another example, malware may exist in files that are uploaded from an infected network device onto a networked storage device such as a file share. Also, malware may be imbedded as part of a data stream that are directed to multiple (two or more) network devices. Identifying an advanced malware attack at the network device, such as a zero-day attack or a polymorphic malware attack for example, has been challenging.

A zero-day attack typically poses the substantial threat to an enterprise network. as these types of attacks are designed to exploit a previously unknown vulnerability within software executing on one or more targeted network devices, and often constitutes a previously unseen type of malware or malware that has not been detected before. In either case, no known signature is available for that malware. As "zero day" malware, by definition, has not been detected before, there are no known signatures for detection of this malware type. Accordingly, signature-based solutions typically fail to detect zero-day malware.

Moreover, advanced malware may co-opt and use previously whitelisted domains, i.e., domains not previously known to be malicious. Accordingly, solutions relying on domain-blacklists fail to be sufficiently effective. Finally, advanced malware is often polymorphic, and thus has signatures that change over time while retaining their core malicious functions, and, once again, may escape detection by such solutions.

Known malware detection systems effectively deal with these problems by employing virtualized behavior detection systems, typically at the periphery of an enterprise network. Unfortunately, the overhead necessary to run a virtualized behavior detection system in user space of a network device interferes and significantly impacts the user experience normally offered by a laptop or other endpoint device.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
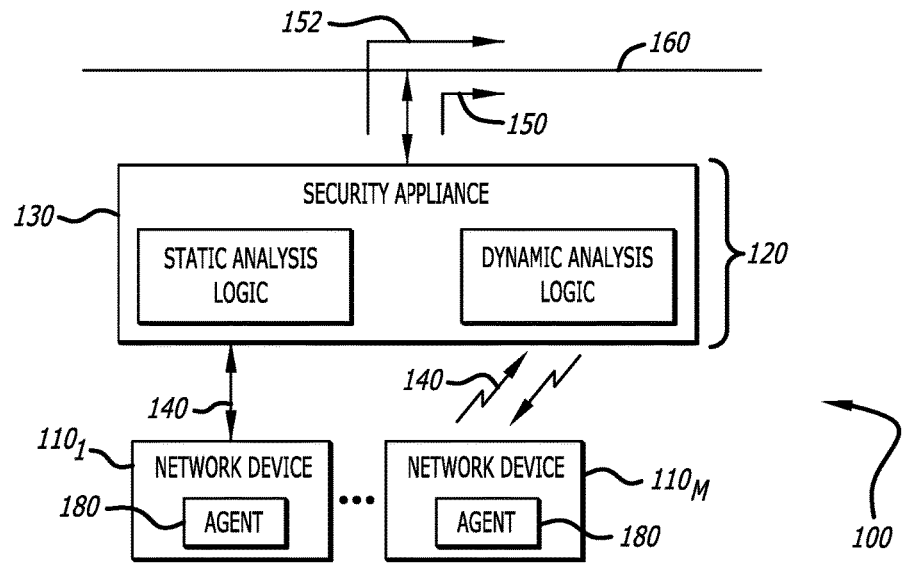
FIG. 1A is a first exemplary embodiment of a network device deploying malware detection logic that is communicatively coupled to a security appliance implemented as part of the enterprise network.

Various embodiments of the disclosure relate to a system and method for detecting advanced malware through generation and comparison of an object fingerprint with malware family fingerprints. A "fingerprint" may be construed as a plurality of indicators that collectively identify an object under analysis. Each "indicator" uniquely corresponds to a representation of content that is part of the object, such as a hash result produced by performing a cryptographic hash operation (e.g., any type of Secure Hash Algorithm including SHA-256 or SHA-512) on the content. An example of content is ordered data that may include, but is not limited or restricted to the following: (i) a sequence of instructions (e.g., instructions sequenced in the order of disassembly) or (ii) a collection of raw "binary" data (e.g., data ordered as received or as transmitted). Herein, a fingerprint may be computed using a feature vector, namely a plurality of features each uniquely corresponding to a representation of ordered data that is being monitored. Herein, an "object fingerprint" refers to a fingerprint that is produced from data associated with an object under analysis while a "malware family fingerprint" refers to a fingerprint associated with a known category of malware (e.g., malware and variants of a malware).

I. SUMMARY

One embodiment of the disclosure is directed to advanced malware detection logic, which may be implemented as part of a network device. Herein, the advanced malware detection logic conducts an analysis of an object (referred to as a "similarity analysis") in an attempt to classify the object as malicious or benign. This similarity analysis may include a determination of a level of correlation between indicators of an object fingerprint for an object under analysis (e.g., a hash results associated with a sequence of instructions, an ordered collection of raw "binary" data, or another type of ordered data associated with the object under analysis) and indicators associated with at least known malicious objects. According to one embodiment of the disclosure, this level of correlation may be ascertained by determining the number, percentage or ratio of indicators of the object fingerprint that compare to indicators for each of the malware family fingerprints, when all of the indicators of the malware family fingerprint being equally weighted. Alternatively, the level of correlation may be ascertained by determining whether a certain number of higher weighted indicators of a malware family fingerprint compare to indicators of the object fingerprint. The indicators with an increased weighting may be selected as those indicators whose presence denotes an increased likelihood of the object being associated with a malicious attack.

The advanced malware detection logic is configured to leverage machine learning and experiential knowledge of known malicious and perhaps benign software during its analysis of objects received by the network device to identify malicious software at any point in its attack lifecycle. The operations of the advanced malware detection logic may be conducted by a network device without compromising usability (user experience).

In accordance with one embodiment of the disclosure, the advanced malware detection logic conducts a "moving window" analysis of content, such as instructions that are disassembled from binary code of the object. The instructions are analyzed to generate an object control graph, which represents the operational flow of the object based on an analysis of the disassembled instructions without execution of these instructions. The object control graph features selected groupings of instructions (basic blocks) and control paths between these basic blocks. Thereafter, the advanced malware detection logic produces representations (e.g., hash results, results of reduced size than the sequence of instructions, etc.) for each basic block as defined by an adjusting (sliding) analysis window. These representations are compared to features of a feature vector, and when a representation matches one of the features, that feature is set. Hence, unique portions of the analyzed content are captured as a feature of the feature vector.

After completing analysis of the instructions that form the object control graph, the feature vector now represents an object fingerprint and each "set" feature represents an indicator of the object fingerprint. For classification of the object, the object fingerprint is compared to a plurality of malware family fingerprints. This comparison may involve a determination of a level of correlation between the object fingerprint and any malware family fingerprint, which may include a comparison of the indicators of the object fingerprint to malicious indicators of the malware family fingerprints (e.g., representations of sequences of instructions or ordered data typically used by a particular malware family). The malware family fingerprints may be fetched from a database accessible to the network device via a network, where some or all of the malware family fingerprints may be cached and updates of the malware family fingerprints may occur periodically or aperiodically, employing a "push" or "pull" methodology to secure these malware family fingerprints.

In accordance with another embodiment of the disclosure, the advanced malware detection logic conducts the moving window analysis of a collection of raw "binary" data associated with the object. Herein, the advanced malware detection logic treats the entire collection of binary data as a single basic block of an object control graph, where an illustrative example is described below. A sliding window (e.g., a first number of bytes that define a boundary for the analysis) along with a window step size (e.g., a second number of bytes that is less than the first number of bytes) are selected. As an illustrative example, with a fixed, sliding window of 128 bytes and a fixed, window step size of 16 bytes, the moving window analysis advances 16 bytes after each sliding window calculation of 128 bytes of binary data until a full window of binary data is not available. The iterative analysis creates representations of 16-byte subsets of binary data, which is used in the computation of the object fingerprint associated with the object under analysis by setting those features in the feature vector that match or have a certain level of correlation with that feature (e.g., a predetermined number of bytes match the representation associated with the feature). Thereafter, the feature vector constitutes the object fingerprint.

In accordance with yet another embodiment of the disclosure, a similar technique is applied to classify "unknown" objects, such as a binary object (executable) stored on or being processed by a network device. The technique may be applied, for example, pursuant to a schedule or upon execution of the binary object, not analysis of the content of the object. Significantly, this technique is employed at a network (endpoint) device during its normal operation and often in real time, either as a foreground process or background process.

The advanced malware detection logic deployed within a network device may be configured to conduct operations to detect advanced malware, including the following operations:
  (1) extract and optionally disassemble an object (e.g., binary code, "raw" binary data) to create an object control graph (a graph of the control flow particular to the object);
  (2) determine a size for a sliding window (of a size corresponding to the object type) for analysis of the object control graph and optionally the stepwise adjustment of the sliding window;

(3) analyze content of the object control graph to determine whether a certain degree of correlation exists between the collective content defined by iterative moving window analyses, where the analysis may involve a comparison of indicators that correspond to hash results associated with certain ordered data (e.g., sequence of instructions, group of binary data, etc.) to malicious and/or benign indicators that represent hash results associated with ordered data associated with known malware and/or benign objects;

(4) classify whether the degree of correlation indicates that the object is associated with advanced malware, in some embodiments employing a score generator to arrive at a level of classification (e.g., malicious or benign);

(5) if the object is considered to be malicious, determine the content (e.g., code as a sequence of instructions, group of binary data) corresponding to each sliding window, generate an identifier for each sliding window, and generate alerts of maliciousness for transmission to administrators and possible the endpoint user; and (6) distribute the generated identifiers to static detection logic of the network device, to a security appliance or centralized management system on the network, and/or to a remote signature distribution service.

II. TERMINOLOGY

In the following description, certain terminology is used to describe features of the invention. For example, in certain situations, the term "logic" is representative of hardware, firmware and/or software that is configured to perform one or more functions. As hardware, logic may include circuitry having data processing or storage functionality. Examples of such circuitry may include, but are not limited or restricted to a microprocessor; one or more processor cores; a programmable gate array; a microcontroller; an application specific integrated circuit; receiver, transmitter and/or transceiver circuitry; semiconductor memory; combinatorial circuitry; or the like. It is contemplated that all logic components, typically represented by boxes in FIGS. 1A-7 herein, may be deployed as hardware, software and/or firmware.

Logic also may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information that is part of the object. One example of content may include one or more sequences of instructions such as opcode, for example, that is disassembled from binary code. Another example of content may include a collection of "raw" binary data (e.g., bits with logic "1" or "0" values). The "object" may include binary code (e.g., executable, dynamic link library "DLL", etc.), which features one or more processor instructions. Also, the terms "compare," "comparing," "comparison" or any tense thereof generally mean determining if a predetermined level of correlation is achieved between two items, where one of the items may include a fingerprint associated with an object under analysis.

The term "object" generally refers to content, namely a collection of data in transit (e.g., propagating over a network) or at rest (e.g., stored), which has a logical structure or organization that enables it to be classified for purposes of analysis for malware. In one embodiment, an object may include an executable in any of a variety of file formats. As illustrative examples, the file formats may include Android™ APK, x86 Windows® supporting 32-bit or 64-bit operating system, Flash® files, or the like.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a netbook, a mobile phone, a tablet, a computer, security appliance, a mainframe, a server, a router, a bridge, a switch, or other intermediary communication device, etc.). Other examples of a network device includes a sensor (described above) as well as a computing node, namely hardware and/or software that operates to receive information from a sensor, and when applicable, perform malware analysis on that information.

According to one embodiment, the term "malware" may be construed broadly as any code or activity that initiates a malicious attack or any operations associated with anomalous or unwanted behavior. For instance, as an illustrative embodiment, malware may correspond to a type of malicious computer code that executes an exploit to take advantage of a vulnerability in software. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. In yet another alternative, malware may correspond to information that pertains to the unwanted behavior such as a process that causes data such as a contact list from a network device to be uploaded by a network to an external storage device without receiving permission from the user.

The term "transmission medium" is a communication path between two or more network devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a software that is configured to provide an isolated run-time execution of an object in accordance with one or more selected applications supported by one or more operating systems. The run-time execution mimics the performance of a targeted device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. GENERAL ARCHITECTURE

Figure 1B:
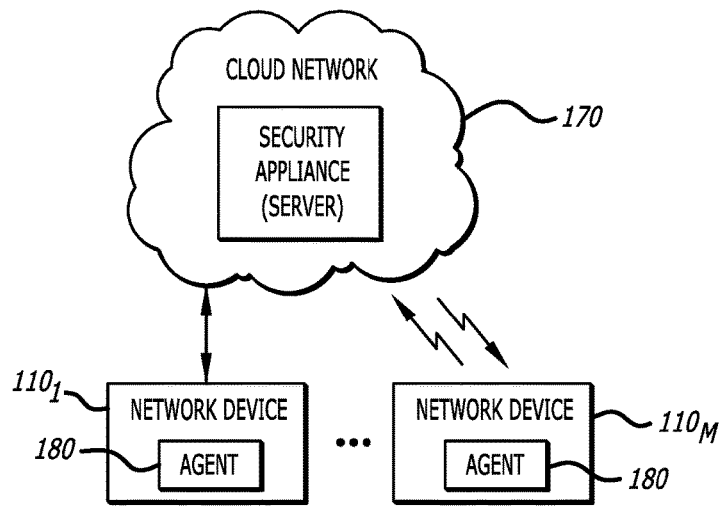
FIG. 1B is a second exemplary embodiment of a network device deploying advanced malware detection logic that is communicatively coupled to cloud services.

Referring to FIGS. 1A-1B, exemplary block diagrams of a malware detection system 100 is shown. The malware detection system 100 features one or more network devices $110_1$-$110_M$ ($M\geq 1$) that are communicatively coupled to a centralized system 120. As shown in FIG. 1A, according to one embodiment of the disclosure, the centralized system 120 may be a security appliance 130 that is configured to receive analysis results 140 from any of the network devices $110_1$-$110_M$ (e.g., network device $110_1$). The analysis results 140 may include an object fingerprint associated with an object that, upon analysis by the network device $110_1$, is determined, in accordance with a level of confidence (e.g., probability), to be associated with malware. Additionally, the analysis results 140 may further include a representation of the object under analysis (e.g., a hash result of the object, a pointer or link to the object, etc.) or the object itself. Of course, it is contemplated that the network device $110_1$ may send the analysis results 140 directly to a management system of the centralized system 120 (e.g., cloud-based management system, remotely located management system from the network devices $110_1$-$110_M$, etc.) in lieu of the security appliance 130.

Based on the analysis results 140 from the network device $110_1$, the security appliance 130 generates a report 150 and/or alert 152 for transmission to a network administrator. The report 150 may include information from the analysis results 140, including a source of the object under analysis, information that identifies the probability of the object being malicious or benign, the know malicious family to which the object pertains (if malicious), or the like. The alert 152 may simply include signaling that initiating one or more messages (e.g., text message, email message, and/or automated phone call) to warn a network administrator of detection of a malicious object, namely an object having a level of confidence (e.g., probability) of being associated with a malicious attack (e.g., known vulnerability). The security appliance 130 may be further configured to conduct a secondary analysis of the object such as a static analysis of the object (e.g., bit pattern analysis, heuristic analysis, etc.) and/or a dynamic analysis (e.g., virtual machine based executing or processing of the object). Although not shown in detail, it is contemplated that a version of the report 150 and/or alert 152 may be transmitted from the network device $110_1$ to a network administrator or a management system that provides consolidation of reports.

As further shown in FIG. 1A, the security appliance 130 may be implemented as a network device that is either coupled to the transmission medium 160 directly or communicatively coupled with the transmission medium 160 via an interface (not shown) operating as a data capturing device. For the later embodiment, the interface may operate as a network tap that extracts information from data traffic propagating over the transmission medium 160.

The one or more network devices $110_1$-$110_M$, sometimes identified as "network device(s)," may be located on-site at an enterprise premises (e.g., part of the enterprise network infrastructure located at a single facility utilized by the customer or at a plurality of facilities). Alternatively, the network device(s) $110_1$-$110_M$ may be mobile devices that communicate with the centralized system 120 located on-site (e.g. at enterprise's premises) or located outside the enterprise network infrastructure, such as cloud-based services 170 of FIG. 1B. The cloud-based services 170 may be hosted by a cybersecurity provider or another entity separate from the customer (enterprise).

Each network device $110_1$-$110_M$ includes an agent 180 that conducts a similarity analysis of an object by determining a level of correlation between indicators associated with a fingerprint pertaining to an object under analysis and indicators associated with a fingerprint pertaining to known malicious and/or benign objects. This level of correlation may be partially or solely used for classification of the object as malicious, benign or suspicious (where not definitely malicious or benign). Herein this level of correlation may be determined by comparing an object fingerprint associated with the object under analysis, where each indicator of the object fingerprint may correspond to a representation of ordered data (e.g., a sequence of instructions, an ordered collection of raw "binary" data, etc.) to indicators of malware family fingerprints. Also, the ordered data for a representation pertains to ordered data within a sliding window (as described below) and different types of representations may include a hash result of the ordered data (e.g., SHA-256 result, MD5 result, SHA-512 result, etc.) or any logical operation on the ordered data that produces the result having a lesser size than the ordered data. The indicators of the object fingerprint are then compared to malicious indicators of one or more malware family fingerprints. The agent 180 may be configured as hardware or as software executed by hardware deployed within a corresponding network device $110_1, \ldots,$ or $110_M$, as described in FIG. 2.

Figure 2:
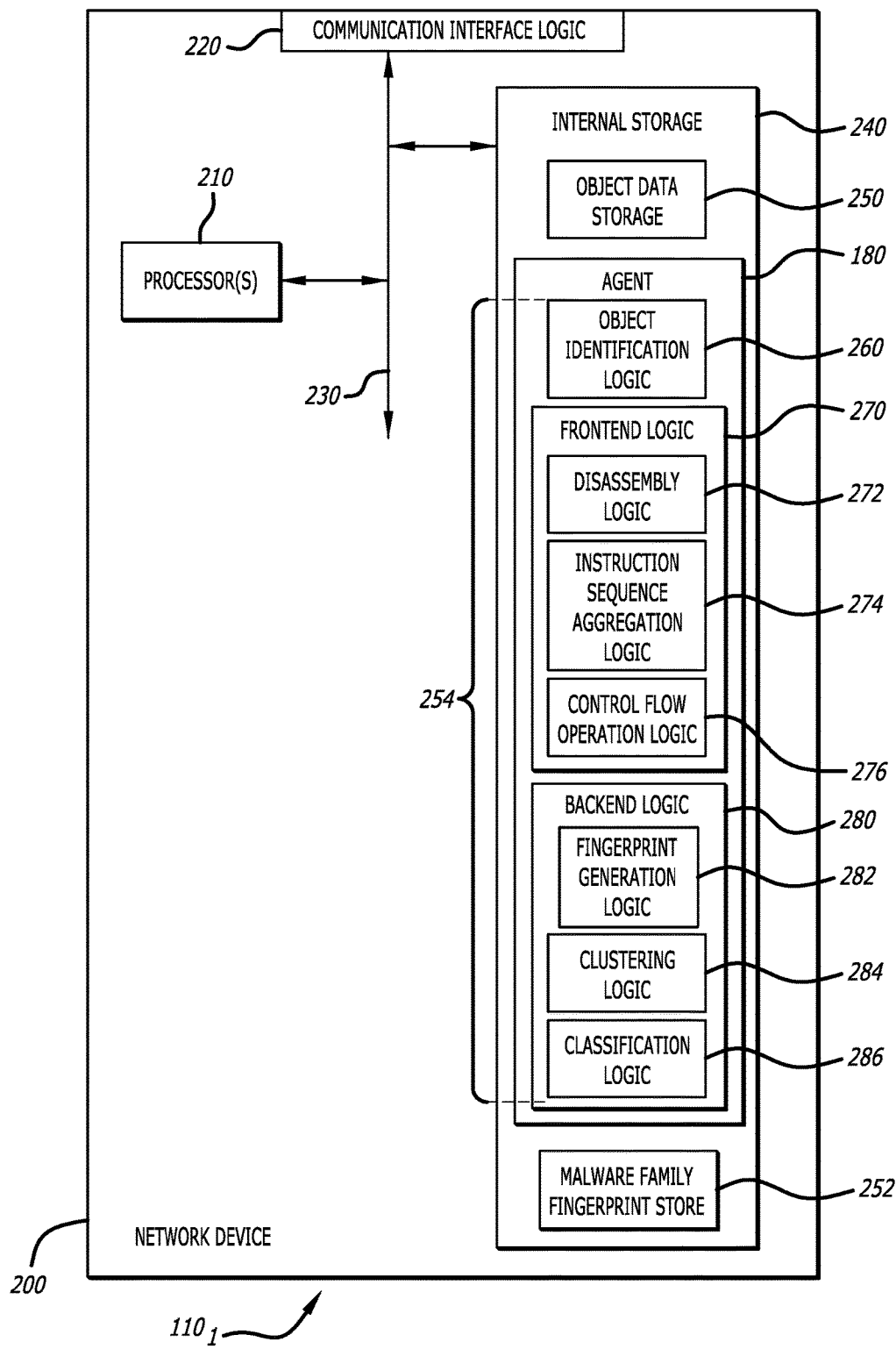
FIG. 2 is an exemplary embodiment of the internal architecture of a network device of FIG. 1A or FIG. 1B.

Referring now to FIG. 2, an exemplary embodiment of a logical representation of the architecture of one of the network devices $110_2$-$110_M$, such as network device $110_1$ for example, is shown. The network device $110_1$ includes a housing 200, which is made entirely or partially of a hardened material (e.g., hardened plastic, metal, glass, composite or any combination thereof) that protect circuitry within the housing 200. Examples of the circuitry may include one or more processors (hereinafter "processor(s)") 210, communication interface logic 220, transmission medium 230 and internal storage 240.

As shown, communication interface logic 220 enables communications with other network devices to receive objects for analysis and to output results of the analysis. The communication interface logic 220 is further configured to receive updates to the agent 180. According to one embodiment of the disclosure, communication interface logic 220 may be implemented as a physical interface including one or more ports for wired connectors. Additionally, or in the alternative, communication interface logic 220 may be implemented with one or more radio units for supporting wireless communications with other wireless network devices.

Processor(s) 210 is coupled to the internal storage 240 via transmission medium 230. According to one embodiment of the disclosure, the internal storage 240 includes an object data store 250, a malware family fingerprint data store 252 that operates as cache memory for the malware family fingerprints, and the agent 180 including advanced malware detection logic 254. The advanced malware detection logic 254 includes (a) object identification logic 260, (b) frontend logic 270, and (c) backend logic 280. Although represented as software, the agent 180 or portions of the agent 180 may be configured as hardware, firmware or a collection thereof.

The object identification logic 260 is configured to categorize an object that is being analyzed by the advanced malware detection logic 254. According to one embodiment of the disclosure, the object identification logic 260 categorizes the object by at least determining the object type as different object types require different methods of disassembling and different sliding window sizes. Different object types may include, but are not limited or restricted to Android™ APKs, x86 Windows® binaries, flash files, or the like. Alternatively, or in combination with the object type analysis, the object identification logic 260 may operate to categorize (or further categorize) the object based on the type of operating system (OS) utilized by that object.

The frontend logic 270 is responsible for performing operations to generate an object control graph that is used in the computation of an object fingerprint for the object. According to one embodiment, the frontend logic 270 includes disassembly logic 272, instruction sequence aggregation logic 274 and control flow generation logic 276. The disassembly logic 272 is configured to detect whether the object is binary code, and if so, disassembles the binary code into instruction sequences. Depending on the category selected for the object by the object identification logic 260, the disassembly logic 272 may perform different disassembly operations on the object.

For instance, where the object is an Android™ APK, the disassembly logic 272 may operate as a utility (dexdump) where the output includes opcode (instructions) associated with the Android™ APK under analysis. As another example, where the object is an x86 Windows® binary, the disassembly logic 272 may operate the objdump utility where the output includes opcode (instructions) associated with the binary. As yet another example, where the object is flash file, the disassembly logic 272 may operate an ActionScript program to convert the flash file into opcode (instructions).

Thereafter, after translation of the object into a sequence of instructions, the instruction sequence aggregation logic 274 arranges the instructions into basic blocks. A "basic block" includes one or more instructions that are to be executed in sequence and the sequence completes without a change in control flow. The change in control flow may involve a transition of execution flow without completing an operation associated with the executed instruction (e.g., a Jump instruction, etc.). Hence, parsing through the sequence of instructions, the instruction sequence aggregation logic 274 may produce one or more basic blocks that may be operating sequentially (in serial) and/or in parallel.

Based on the analytic (basic block) information, the control flow generation logic 276 generates a nodal graph (referred to as an "object control graph"). The object control graph is a logical representation of relationships between objects and properties formulated from the analytic information. For instance, for illustrative purposes, each basic block may be logically represented as a node in the object control graph. The control flow may be represented by one or more links (or edges) between the nodes, where multiple links may logically represent multiple paths from an object or multiple paths to an object.

The backend logic 280 is responsible for generating an object fingerprint associated with the object, classifying the object fingerprint for determining whether the object fingerprint is a variant of a malware family fingerprint, and providing the object fingerprints to a separate "knowledge" server based on their classification. Optionally, although not shown, the backend logic 280 may include logic for generating reports that include information based on operations conducted by the classification logic 286. According to one embodiment, the backend logic 280 includes fingerprint generation logic 282, clustering logic 284 and classification logic 286.

The fingerprint generation logic 282 is responsible for analyzing the object control graph associated with the object and generating an object fingerprint based on such analysis. For example, the fingerprint generation logic 282 may be configured to parse an object control graph in accordance with a "moving" window analysis, where the window size may be fixed or may vary, perhaps based on the object type (e.g., window size for APK-type objects being different than window size for x86 Windows® object). For an architecture supporting variable-length sliding windows, metadata for use in determining the sliding window size would need to be provided to the fingerprint generation logic 282. For example, metadata associated with the object type may be provided from the disassembly logic 272 of the frontend logic 270, where the metadata may be used by the fingerprint generation logic 282.

Thereafter, for each subset of instructions or ordered binary data within a basic block of an object control graph that fills an entire sliding window, a representation of the subset of instructions or the ordered binary data is generated (e.g., hash result, result of a lesser bit size that the subset of instructions or ordered binary data). The representation is compared to values within one or more entries of a feature vector, where each feature may correspond to a representation of a predetermined sequence of instructions or a collection of ordered data that is chosen to be monitored. In response to a successful comparison of a representation produced from the similarity analysis to a representation corresponding to a feature of the feature vector, that feature is tagged or set. This operation is performed in an iterative manner until parsing of the object control graph in accordance with the sliding window analysis has completed. Upon completing the parsing of the object control graph, the feature vector corresponds to an object fingerprint for the object under analysis.

The classification logic 286 is responsible for determining whether the object under analysis is potentially malicious or benign, which may be handled by comparing the object fingerprint to one or more malware family fingerprints, some of which may be stored locally within the malware family fingerprint data store 252. In particular, the classification logic 286 conducts (or at least controls) a comparison between indicators of the object fingerprint and corresponding indicators of the malware family fingerprints. This comparison may involve determining whether a number of indicators of the object fingerprint that match a malware family fingerprint exceeds a prescribed threshold value. Alternatively, the comparison may involve a weighted determination in which a matching of some indicators of the object fingerprint to indicators of a malware family fingerprint denotes a comparison.

The clustering logic 284 is responsible for directing the object fingerprint, when determined to be malicious, to a knowledge database or other server that is configured to maintain fingerprints associated with detected malicious object fingerprints.

IV. FINGERPRINT DETECTION METHODOLOGY—BINARY CODE

Figure 3:
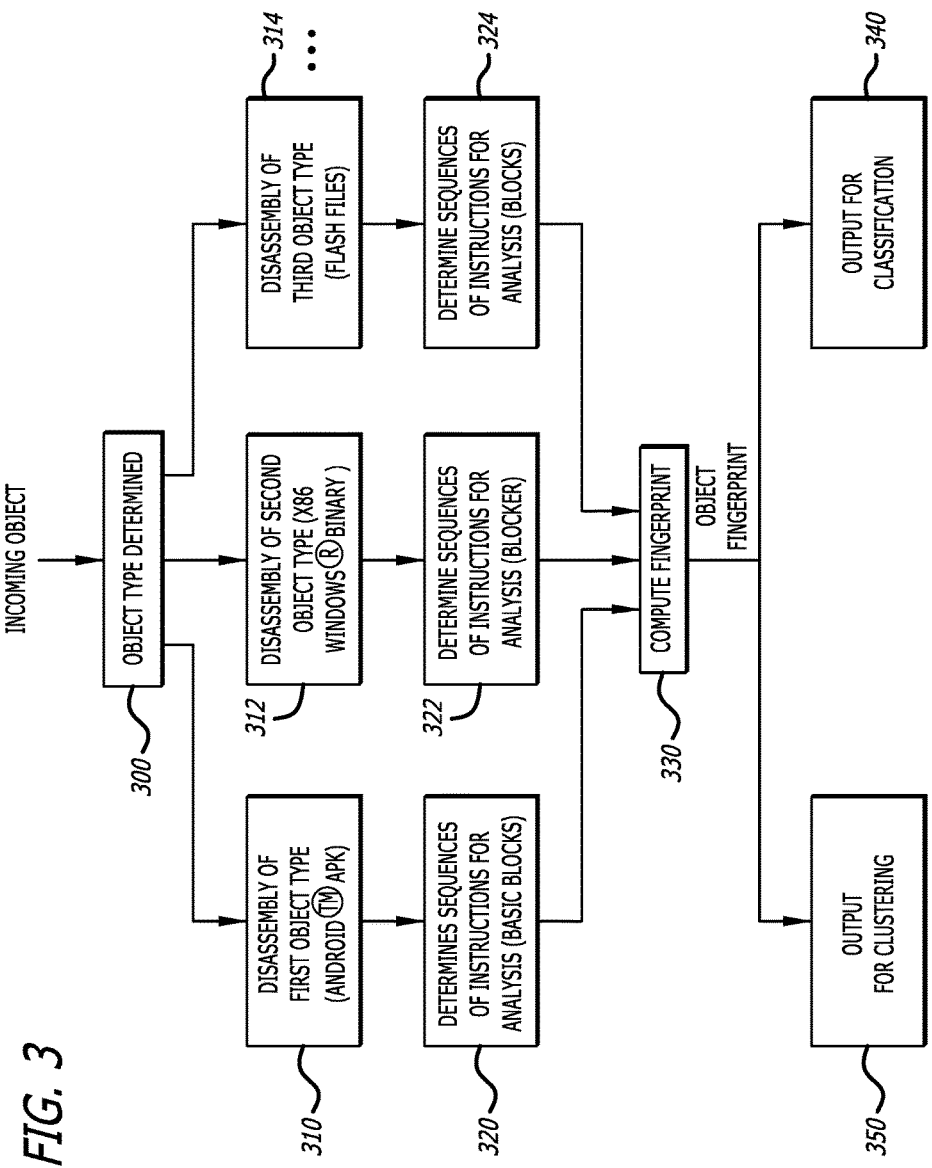
FIG. 3 is a first exemplary embodiment of an operational flow of the advanced malware detection logic deployed within a network device of FIG. 1A or FIG. 1B in generating an object fingerprint based on analysis of disassembled instructions from binary data.

Referring to FIG. 3, a first exemplary embodiment of operations conducted by the advanced malware detection logic deployed within a network device of FIG. 1A or FIG. 1B in generating an object fingerprint is shown. Herein, in response to receipt of an incoming object (e.g., intercepted during transit over a network, uploaded from a storage device, etc.), the advanced malware detection logic determines the object type (element 300). This determination may include an analysis of the content of the object and/or the format of the object. For instance, as an illustrative example, the object type may be determined by review of a header of the object and magic numbers which are constant numerical or text values used to identify a file format or protocol.

When the object is determined to be a first object type (e.g., Android™ APK), the advanced malware detection logic conducts a disassembly operation on the object to recover instructions forming at least part of the object, and thereafter, determines one or more sequences of instructions each pertaining to a particular basic block of an object control graph (elements 310 and 320). Sequential instructions are placed in the same basic block when there is no change in control flow between these instructions. However, in response to a change in control flow (e.g., presence of a conditional instruction, Jump instructions, Goto instruction, etc.), a new basic block is generated in the object control graph for instructions associated with the control flow change. The grouping of instructions within basic blocks, which are based on changes in control flow, is continued until all of the dissembled instructions have been represented within the object control graph.

Similarly, when the object is determined to be either a second object type (e.g., x86 Windows® binary) or a third object type (e.g., Flash file), the advanced malware detection logic conducts a disassembly operation on the object to recover the instructions forming at least part of the object, and thereafter, determines sequences of instructions that pertain to a particular basic block as described above (elements 312 & 322 and/or elements 314 & 324).

Figure 4A:
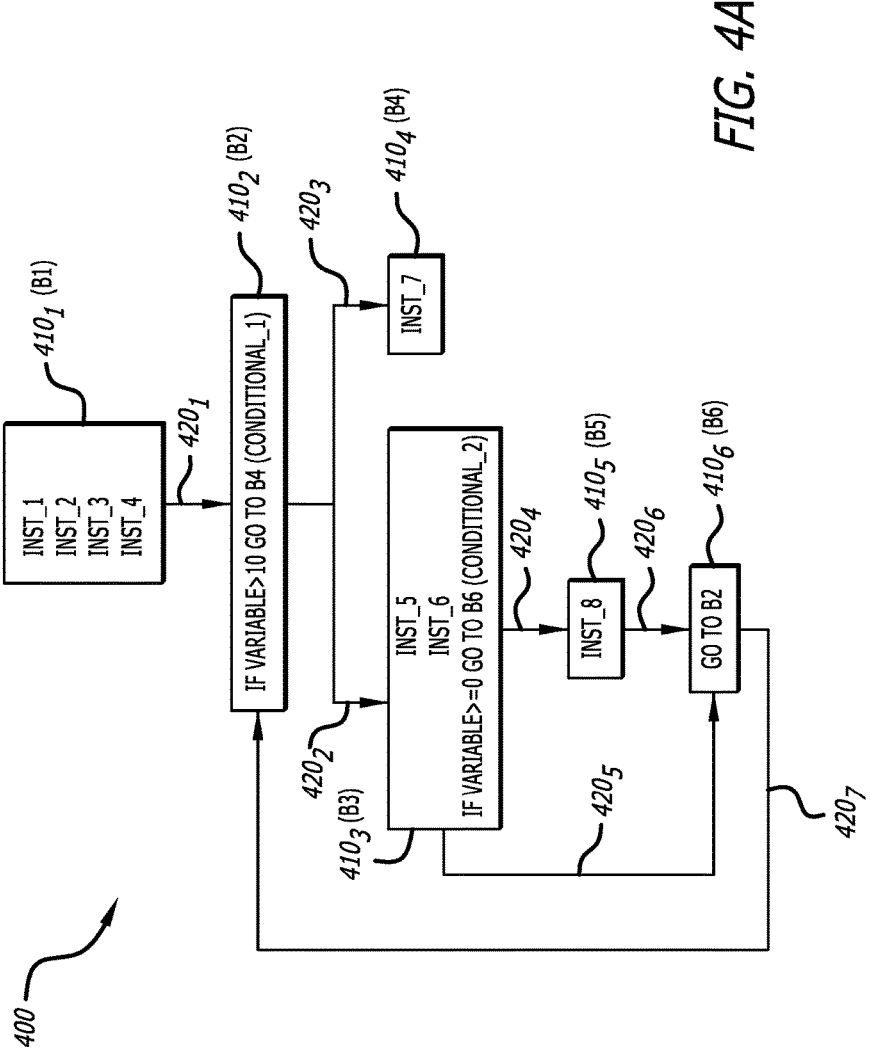
FIGS. 4A and 4B are exemplary embodiments of a control graph formulated during analysis of an incoming object by the advanced malware detection logic for use in generating basic blocks separately analyzed in the formation of an object fingerprint.

The basic blocks form nodes of the object control graph with edges (links) that are illustrative of the control flow, as shown in FIG. 4A. The content of the object, which may be represented by the object control graph, is analyzed to compute an object fingerprint (element 330), which undergoes a classification operation to determine whether the object fingerprint compares to any malware family fingerprint, namely the level of correlation between the object fingerprint and a malware family fingerprint exceeds a threshold (element 340). If so, the object fingerprint that is determined to be malicious may be uploaded to a remote destination (e.g., remote data server such as security appliance 130 of FIG. 1) for subsequent analysis in clustering this fingerprint to other similar malicious fingerprints (e.g., malware family fingerprints) stored in a knowledge database (element 350).

Figure 4B:
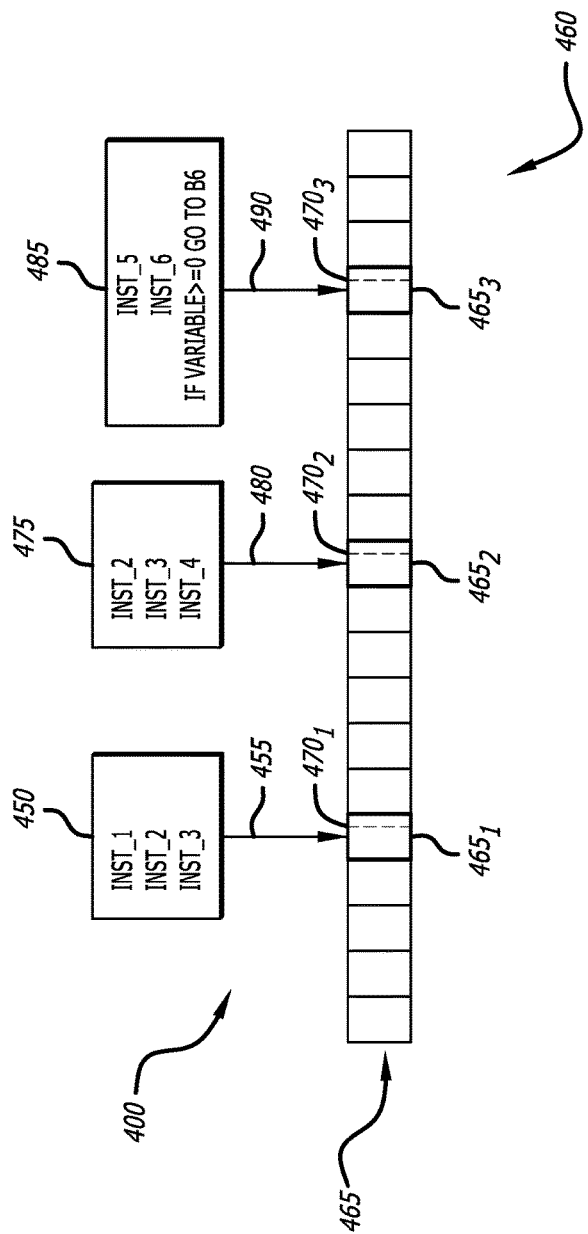

As shown in FIG. 4A, an illustrative embodiment of an object control graph 400 includes a plurality of basic blocks 410 (e.g., six basic blocks "Bx" $410_1$-$410_6$) and edges $420_1$-$420_7$ illustrative of the control path between basic blocks $410_1$-$410_6$. As shown, a first basic block (B1) $410_1$ includes four instructions, a third basic block (B3) $410_3$ includes three instructions and the remainder of the basic blocks B2 $410_2$ and B4 $410_4$-B6 $410_6$ include a single instruction. Upon setting of the sliding window to a fixed size of "n" instructions (e.g., n=3 instructions for this embodiment), the moving window analysis would detect three (3) instruction sequences as potential indicators for an object fingerprint of the object, as shown in FIG. 4B. According to this embodiment, the instruction sequences less than the window size (e.g., 3 instructions) in the sequence are ignored in order to avoid a setting of high number of indicators in the feature vector that may cause unacceptable levels of false positives in malware analysis.

In particular, in accordance with the sliding window-based analysis, a sliding window would capture a first sequence of instructions 450 within basic block $410_1$, namely instructions Inst_1, Inst_2 and Inst_3. Thereafter, the advanced malware detection logic would conduct an operation on the first sequence of instructions 450, such as a one-way hash operation for example, to generate a representation 455 of the first sequence of instructions 450 that operates and determine whether the representation 455 compares with any features 465 for the feature vector 460, where the features 465 represent instruction sequences being monitored. If so, an indicator $470_1$ corresponding to the feature 4651 within the feature vector 460 is set.

As further shown in FIG. 4B, in accordance with the moving window analysis, a sliding window would capture a second sequence of instructions 475 within basic block $410_1$, namely Inst_2, Inst_3 and Inst_4. Thereafter, the advanced malware detection logic would conduct an operation on the second sequence of instructions 475 to generate a representation 480 of the second sequence of instructions 475. When the representation 480 compares to a different feature 4652 of the feature vector 460, an indicator $470_2$ associated with the feature is set.

Thereafter, a sliding window would capture a third sequence of instructions 485 within the third basic block $410_3$, namely Inst_5, Inst_6 and Conditional_2 in third basic block $410_3$. Thereafter, the advanced malware detection logic would conduct an operation on the third sequence of instructions 485 to generate a representation 490 of the third sequence of instructions 485. When the representation 490 compares to yet another different feature $465_3$ of the feature vector 460, the indicator $470_3$ of feature $465_3$ is set. For the illustrative example, as there are no further basic blocks having a size equal to or greater than the window size, no further indicators may be set.

Figure 5:
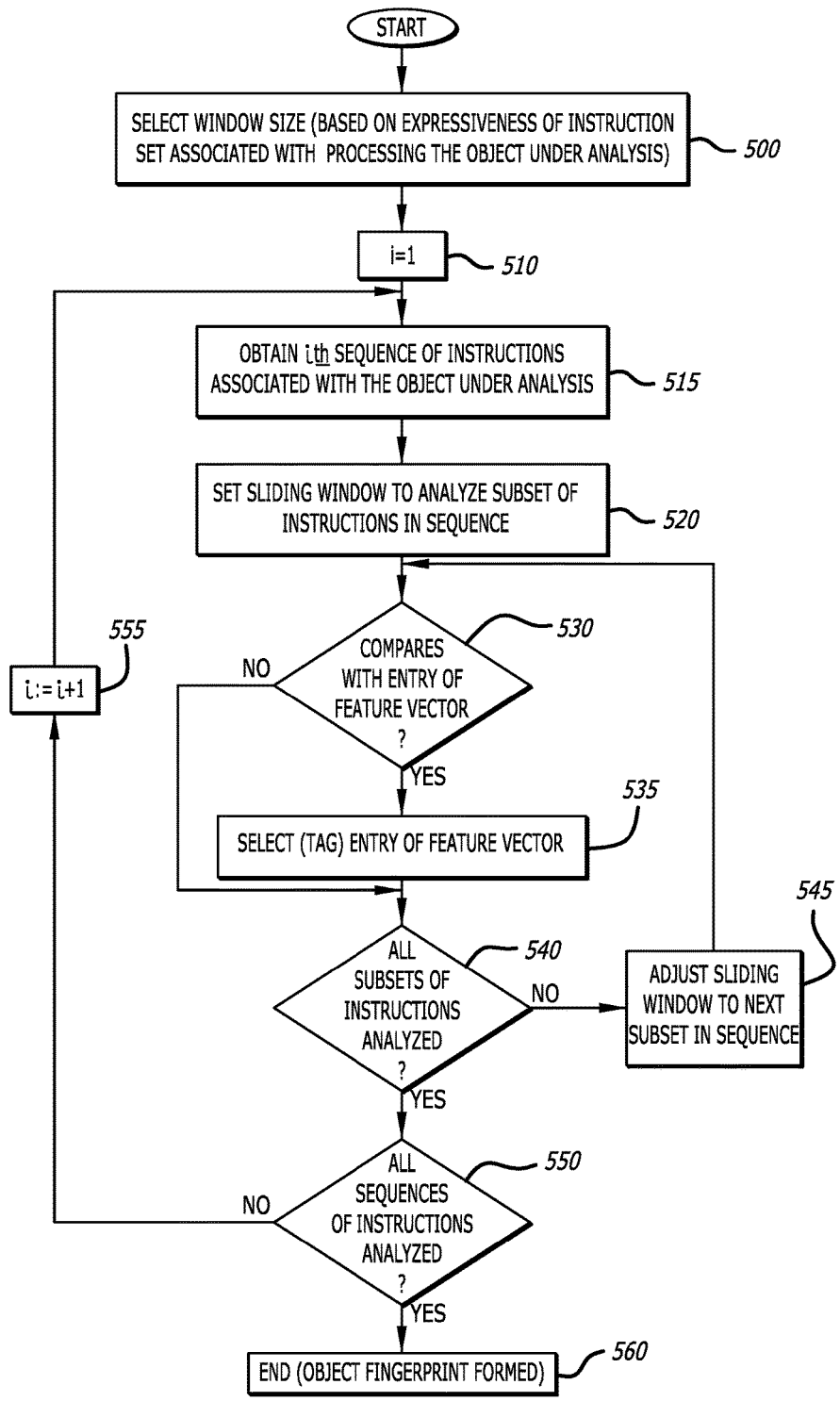
FIG. 5 is an exemplary embodiment of an operational flow of the advanced malware detection logic deployed within a network device of FIG. 1A or FIG. 1B in generating the object fingerprint based on disassembled instruction sequences for comparison with fingerprints associated with known malware families in determining whether the object is associated with a zero-day attack.

Referring now to FIG. 5, is a first flowchart illustrating an exemplary method for generating an object fingerprint is described below. Initially, a window size may be selected in order to control how sequences of instructions that pertain to one or more basic blocks within the object control graph are parsed (element 500). The window size may influence the number of false positives (smaller windows) or number of false negatives (larger windows) encountered during operability of the malware detection system.

According to one embodiment of the disclosure, the window size may be set to a static, fixed value (e.g., a number of instructions, a number of bytes, etc.). The fixed value for the window size may be in accordance with a default setting that is established by the original equipment manufacturer/software provider. Alternatively, the fixed value for the window size may be selected by a user of the network device or a network administrator during registration of the network device for use on an enterprise network.

According to another embodiment of the disclosure, the window size may be varied based, at least in part, on the expressiveness of the instruction set servicing the particular type of object under analysis. For instance, the variable window size for an Android® APK object is substantially smaller than the variable window size for an x86 Windows® binary because a Delvik® instruction used in an Android™ device is more expressive (i.e., perform more operations) than an x86 instruction. Additionally, or in the alternative, the window size may be varied based on the content itself (e.g., instruction boundaries). For instance, some instruction sets have variable-length instructions, so sliding windows typically represent different number of bytes dependent on the instructions utilized for a specific object type.

Referring still to FIG. 5, upon selecting the window size, a first sequence of instructions associated with the object under analysis is obtained (elements 510 and 515). Based on a moving window analysis and the number of instructions in the first sequence is equal to or exceeds the window size, a representation (e.g., hash result) of a first subset of instructions is obtained (element 520). If the representation of the first subset of instructions compares with any indicators of the feature vector, the indicator is set to denote that the object includes the corresponding instruction sequence (elements 530-535).

Next, for the same basic block, a determination is made as to whether all subsets of the instructions within the basic block have been analyzed, where each neighboring subset of instructions shares at least one instruction (or multiple instructions) with another neighboring subset of instructions (element 540). If all subsets have not been analyzed, the sliding window is adapted to "slide" by a determined number of instructions (e.g., one instruction, two instructions, etc.) to capture a next subset of instructions that are part of the sequence of instructions within the analysis window (element 545). However, if all subsets of the instructions within the basic block have been analyzed, a determination is made whether all sequences in different basic blocks have been analyzed (element 550). If not, the next sequence of instructions within a different basic block is determined and analyzed, as described in elements 515-555. Otherwise, the object fingerprint has been generated for the object (element 560).

V. FINGERPRINT DETECTION METHODOLOGY—RAW DATA

Figure 6:
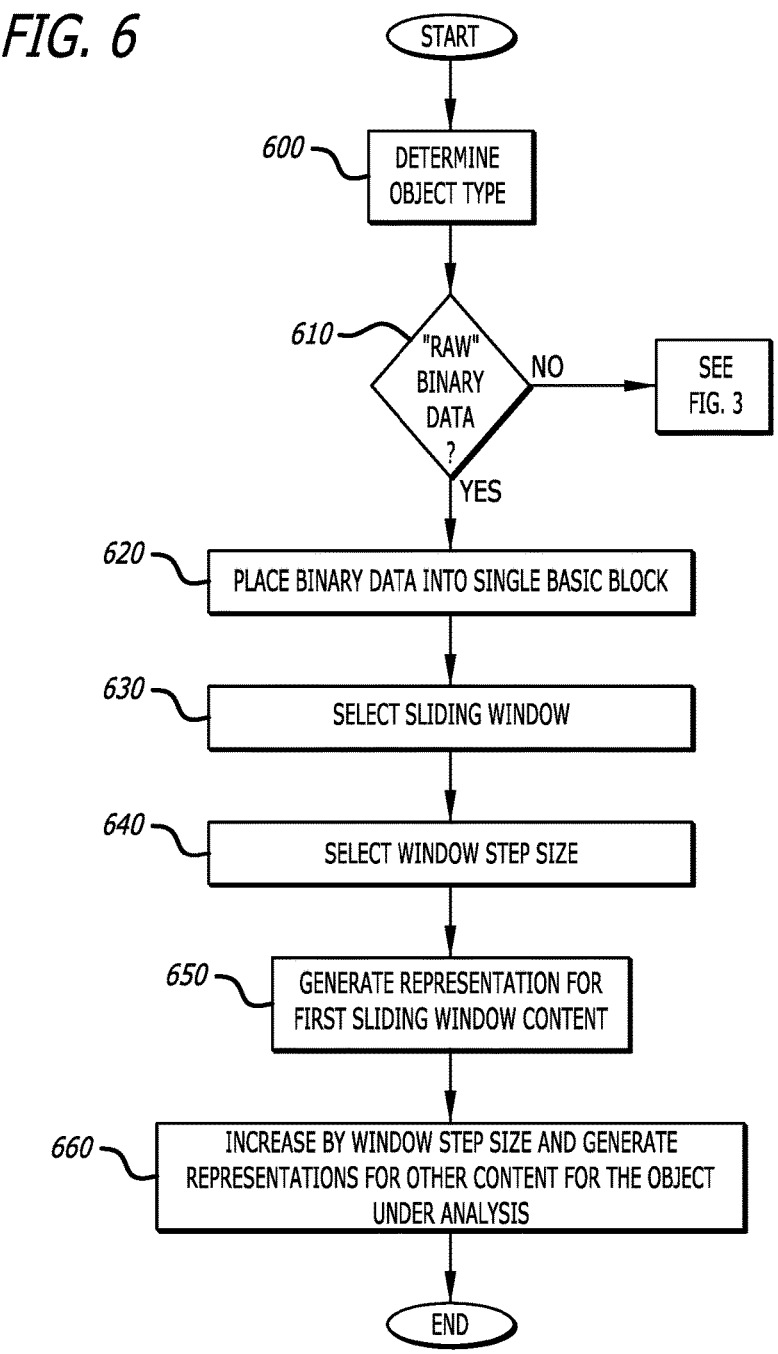
FIG. 6 is a second exemplary embodiment of an operational flow of the advanced malware detection logic deployed within a network device of FIG. 1A or FIG. 1B in generating the object fingerprint based on analysis of raw data.

Referring now to FIG. 6, an exemplary embodiment of an operational flow of the malware detection logic deployed within a network device of FIG. 1A or FIG. 1B in generating the object fingerprint based on analysis of raw data is shown. In response to receipt of an incoming object, the advanced malware detection logic determines the object type (element 600). This determination may include an analysis of the content of the object and/or the format of the object. Where the content is a collection of raw "binary" data without identification of the object type, the advanced malware detection logic places the binary data in order of receipt into a single basic block (elements 610 and 620).

A sliding window (e.g., a first number "X" of bytes that define a boundary for the analysis) along with a window step size (e.g., a second number "Y" of bytes that is less than or equal to the first number of bytes) are selected (elements 630 and 640). Herein, a representation of a grouping of bytes (e.g., first X bytes of the ordered binary data) is determined, and thereafter, a representation of a second grouping of bytes (e.g., $X+1^{st}$ byte to 2X byte) is determination. The analysis creates representations of the X-byte subsets of binary data, which are used in the computation of the object fingerprint by setting features in the feature vector that correspond to the representations for these X-byte subsets (elements 650 and 660).

VI. ADVANCED MALWARE DETECTION

Figure 7:
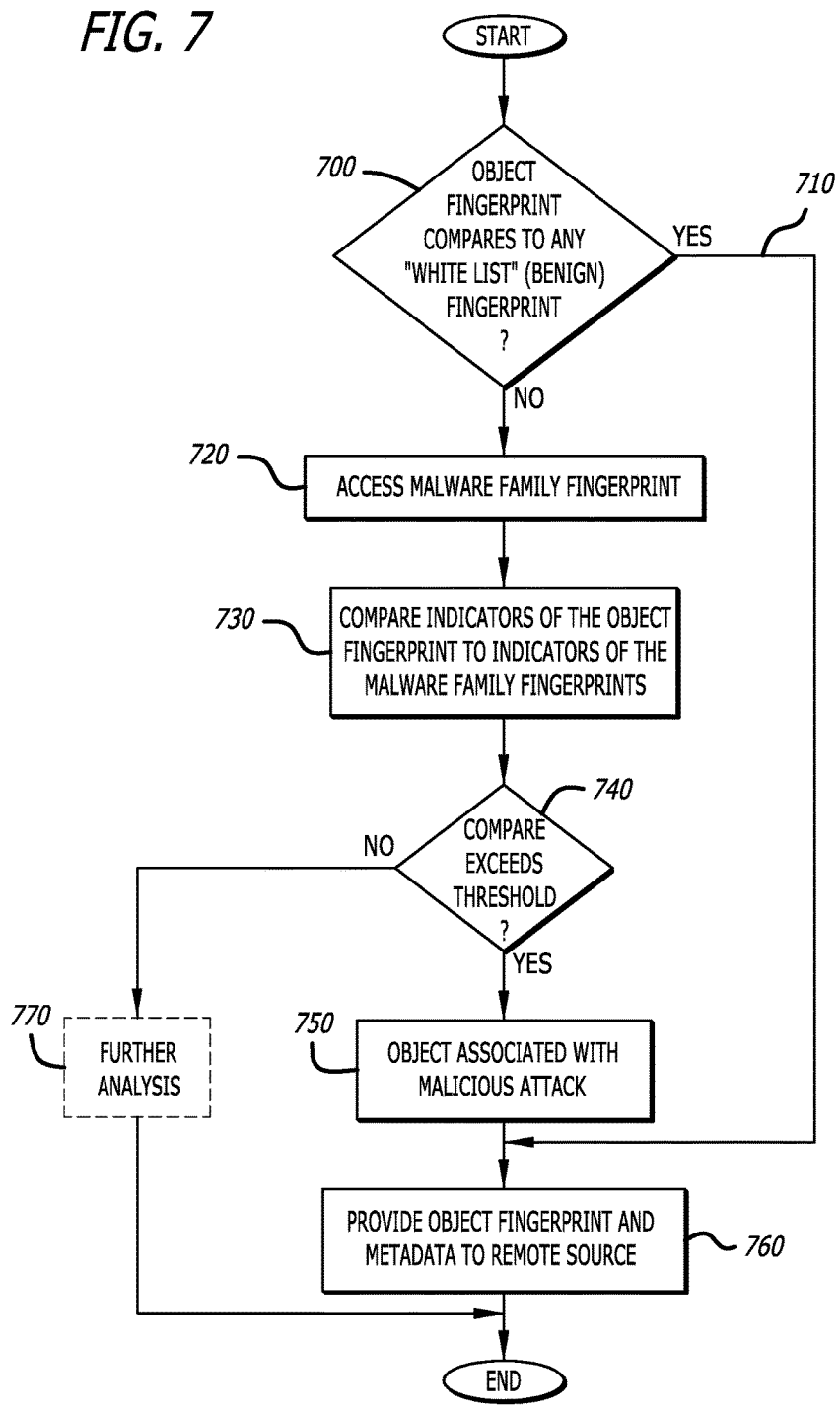
FIG. 7 is an exemplary embodiment of an operational flow of the malware detection logic deployed within a network device of FIG. 1A or FIG. 1B in determining whether an object under analysis is advanced malware through object fingerprint comparisons.

Referring to FIG. 7, an exemplary embodiment of an operational flow of the advanced malware detection logic deployed within a network device of FIG. 1A or FIG. 1B is shown, where the operational flow is directed to a determination as to whether an object under analysis is advanced malware. This determination may involve fingerprint comparisons. More specifically, the advanced malware detection logic has generated an object fingerprint as described above. The advanced malware detection logic compares the object fingerprint to fingerprints that are associated with a white list of benign fingerprints (element 700). If the level of correlation between the object fingerprint and any of the benign fingerprints exceeds a threshold, the object is benign. Hence, no further classification operations are needed, but the object fingerprint may be provided to a remote source for further analysis and placement in the knowledge database (element 710).

Otherwise, the advanced malware detection logic is provided access to malware family fingerprints (element 720). These malware family fingerprints may be stored locally in the malware family fingerprint data store 252 of FIG. 2 or accessed from a remote source. With access to content of the malware family fingerprints, the advanced malware detection logic, and in particular the classification logic 286 of FIG. 2, conducts a comparison between indicators of the object fingerprint and corresponding indicators for one or more of the malware family fingerprints (element 730). This comparison may involve determining whether the number of indicators of the object fingerprint that match indicators of a particular malware family fingerprint exceeds a prescribed threshold value. Alternatively, the comparison may involve a weighted determination in which a matching of indicators of the object fingerprint with certain indicators of a malware family fingerprint denotes a comparison.

If the level of correlation between the object fingerprint and any of the malware family fingerprints exceeds a threshold, the object represented by the object fingerprint is determined to be associated with a malicious attack (element 750). The object fingerprint and metadata associated with the object fingerprint (e.g., compared malware family, source, etc.) is further provided to the remote source for placement into the knowledge database, which may be used as one of the malware family fingerprints for subsequent analysis (element 760). Otherwise, the object fingerprint may undergo additional analysis at the network device (or remote source) as represented by dashed lines 770.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon instructions corresponding to malware detection logic including as part of a software agent operating within a network device, the malware detection logic being executable by one or more processors to perform operations comprising:
   receiving an object for analysis;
   extracting content from the object, the content includes a first plurality of instructions recovered from binary code of the object;
   arranging the extracted content into one or more basic blocks, each basic block of the one or more basic blocks including at least an instruction sequence corresponding to two or more instructions of the first plurality of instructions;

generating, by the network device, an object fingerprint based on an analysis of the one or more basic blocks by at least (i) generating a representation of each instruction sequence of the one or more basic blocks, (ii) aggregating one or more representations associated with each instruction sequence of the one or more basic blocks, and (iii) comparing each of the one or more aggregated representations to a plurality of instruction sequences being monitored as being potentially malicious to produce a result, the result corresponding to the object fingerprint;

analyzing, by the network device, the object fingerprint by at least comparing the object fingerprint to one or more malware family fingerprints to determine whether the object is potentially malicious and associated with an advanced malware; and generating information, based on the analyzing of the object fingerprint, for transmission from the network device to a second network device.

2. The non-transitory storage medium of claim 1, wherein the generating of the information for transmission to the second network device includes comparing of the object fingerprint to the one or more malware family fingerprints and the second network devices corresponds to a security appliance that is configured to conduct a secondary malware analysis of the object.

3. The non-transitory storage medium of claim 1, wherein each representation being a hash result generated from a corresponding instruction sequence.

4. The non-transitory storage medium of claim 1, wherein the arranging the extracted content comprises arranging the first plurality of instructions in accordance with an operational flow of the object, the operational flow is determined from an analysis of an order of execution of the first plurality of instructions without execution of the first plurality of instructions; and segmenting the first plurality of instructions arranged in accordance with the operational flow into the one or more basic blocks, wherein each instruction for each basic block of the one or more basic blocks completes operation without a change in control flow.

5. The non-transitory storage medium of claim 1, wherein the arranging the extracted content comprises generating an object control graph including the one or more basic blocks.

6. The non-transitory storage medium of claim 5, wherein the generating of the object control graph comprises arranging the first plurality of instructions in accordance with a determined order that is based, at least in part, on an order of execution of the first plurality of instructions without execution of the first plurality of instructions; and segmenting the first plurality of instructions arranged in accordance with the determined order into the one or more basic blocks, wherein each instruction for each instruction sequence of the one or more basic blocks completes operation without a change in control flow.

7. The non-transitory storage medium of claim 3, wherein each instruction of the instruction sequence completes operation without a change in control flow.

8. The non-transitory storage medium of claim 1, wherein the generating of the representation of each instruction sequence of the one or more basic blocks comprises generating a first representation of a first instruction sequence that includes a selected number of instructions, the first instruction sequence included as a first block of the one or more basic blocks, the first representation corresponds to a hash result produced by performing a hash operation on the first instruction sequence.

9. The non-transitory storage medium of claim 8, wherein the generating of the representation of each instruction sequence of the one or more basic blocks further comprises generating a first representation of a first subset of a second instruction sequence of a second basic block of the one or more basic blocks; and generating a second representation of a second subset of the second instruction sequence, wherein the first subset of the second instruction sequence differs from the second subset of the second instruction sequence and the first subset of the second instruction sequence sharing at least one instruction with the second subset of the second instruction sequence.

10. The non-transitory storage medium of claim 9, wherein the first subset of the second instruction sequence and the second subset of the second instruction sequence are selected through a sliding analysis window having a width corresponding to the selected number of instructions.

11. The non-transitory storage medium of claim 1, wherein the generating of the representation of each instruction sequence of the one or more basic blocks comprises generating a first representation of a first subset of a first instruction sequence of a first basic block of the one or more basic blocks; and generating a second representation of a second subset of the first instruction sequence, wherein the first subset of the first instruction sequence differs from the second subset of the first instruction sequence and the first subset of the first instruction sequence sharing at least one instruction with the second subset of the first instruction sequence.

12. The non-transitory storage medium of claim 11, wherein the first subset of the first instruction sequence and the second subset of the first instruction sequence are selected through a sliding analysis window having a width corresponding to a selected number of instructions being lesser in number than a number of instructions forming the first basic block.

13. The non-transitory storage medium of claim 1, wherein prior the generating of the object fingerprint, selecting a width of an analysis window to a selected number of instructions, the analysis window being used in the generating of the representation of each instruction sequence of the one or more basic blocks that includes at least the selected number of instructions.

14. The non-transitory storage medium of claim 1, wherein the information for transmission includes a report based on the analyzing of the object fingerprint, the report includes one or more of (i) a source of the object, (ii) a probability of the object being malicious or benign, or (iii) a known malicious family to which the object pertains.

15. The non-transitory storage medium of claim 1, wherein the information for transmission comprises includes an alert including one or more messages to warn of detection of the object as a malicious object.

16. A computerized method for detection of malware, comprising:

receiving an object for analysis;

extracting content from the object, the content includes a first plurality of instructions recovered from non-binary code of the object;

arranging the extracted content into one or more basic blocks, each basic block including at least an instruction sequence corresponding to two or more instructions of the first plurality of instructions;

generating an object fingerprint based on an analysis of the one or more basic blocks by malware detection logic, operating within a network device, at least (i) generating a representation of each instruction sequence of the one or more basic blocks, (ii) aggregating one or more representations associated with each instruction sequence of the one or more basic blocks, and (iii) comparing each of the one or more aggregated representations to a plurality of instruction sequences being monitored as being potentially malicious to produce a result, the result corresponding to the object fingerprint;

analyzing the object fingerprint by at least comparing the object fingerprint to one or more malware family fingerprints to determine whether the object is potentially malicious and associated with an advanced malware; and generating information, based on the analyzing of the object fingerprint, for transmission from the network device to a second network device.

17. The method of claim 16, wherein the generating of the information for transmission includes the comparing of the object fingerprint to the one or more malware family fingerprints, for transmission to the network device being a security appliance that is configured to conduct a secondary malware analysis of the object.

18. The method of claim 16, wherein the content includes the first plurality of instructions disassembled from the binary code of the object.

19. The method of claim 18, wherein the arranging the extracted content comprises arranging the first plurality of instructions in accordance with an operational flow of the object, the operational flow is determined from an analysis of an order of execution of the first plurality of instructions without execution of the first plurality of instructions; and segmenting the first plurality of instructions arranged in accordance with the operational flow into the one or more basic blocks, wherein each instruction for each basic block of the one or more basic blocks completes operation without a change in control flow.

20. The method of claim 18, wherein the arranging the extracted content comprises generating an object control graph including the one or more basic blocks.

21. The method of claim 20, wherein the generating of the object control graph comprises arranging the first plurality of instructions in accordance with a determined order that is based, at least in part, on an order of execution of the first plurality of instructions without execution of the first plurality of instructions; and segmenting the first plurality of instructions arranged in accordance with the determined order into the one or more basic blocks, each of the one or more basic blocks includes one or more instructions of the first plurality of instructions that correspond to an instruction sequence and each instruction of the instruction sequence completes operation without a change in control flow.

22. The method of claim 18, wherein each instruction of the instruction sequence completes operation without a change in control flow.

23. The method of claim 16, wherein the generating of the representation of each instruction sequence of the one or more basic blocks comprises generating a first representation of a first instruction sequence that includes a selected number of instructions, the first representation corresponds to a hash result produced by performing a hash operation on the first instruction sequence.

24. The method of claim 23, wherein the generating of the representation of each instruction sequence of the one or more basic blocks that includes at least the selected number of instructions further comprises generating a first representation of a first subset of a second instruction sequence of a second basic block of the one or more basic blocks; and generating a second representation of a second subset of the second instruction sequence, wherein the first subset of the second instruction sequence differs from the second subset of the second instruction sequence and the first subset of the second instruction sequence sharing at least one instruction with the second subset of the second instruction sequence.

25. The method of claim 24, wherein the first subset of the second instruction sequence and the second subset of the second instruction sequence are selected through a sliding analysis window having a width corresponding to the selected number of instructions.

26. The method of claim 16, wherein the generating of the representation of each instruction sequence of the one or more basic comprises generating a first representation of a first subset of a first instruction sequence of a first basic block of the one or more basic blocks, wherein the first instruction sequence includes a selected number of instructions and the first basic block includes a number of instructions greater than the selected number of instructions; and generating a second representation of a second subset of the first instruction sequence, wherein the first subset of the first instruction sequence differs from the second subset of the first instruction sequence and the first subset of the first instruction sequence sharing at least one instruction with the second subset of the first instruction sequence.

27. The method of claim 26, wherein the first subset of the first instruction sequence and the second subset of the first instruction sequence are selected through a sliding analysis window having a width corresponding to the selected number of instructions.

28. The method of claim 16, wherein prior the generating of the object fingerprint, selecting a width of an analysis window to a selected number of instructions, the analysis window being used in the generating of the representation of each instruction sequence of the one or more basic blocks that includes at least the selected number of instructions.

29. The method of claim 16, wherein the information for transmission includes a report based on the analyzing of the object fingerprint, the report includes one or more of (i) a source of the object, (ii) a probability of the object being malicious or benign, or (iii) a known malicious family to which the object pertains.

30. The method of claim 16, wherein the information for transmission comprises includes an alert including one or more messages to warn of detection of the object as a malicious object.

31. A network device, comprising:
a transmission medium;
one or more hardware processors coupled to the transmission medium;
communication interface logic coupled to the transmission medium, the communication interface logic to receive an object for analysis; and
a memory coupled to the transmission medium, the memory comprises
disassembly logic that, when executed by the one or more hardware processors, extracts content from the object, the content includes a first plurality of instructions recovered from binary code of the object,
aggregation logic that, when executed by the one or more hardware processors, arranges the extracted content into one or more basic blocks, each basic block including at least an instruction sequence corresponding to two or more instructions of the first plurality of instructions, and
fingerprint generation logic that, when executed by the one or more hardware processors, generates an object fingerprint based on an analysis of the one or more basic blocks by at least (i) generating a representation of each instruction sequence of the one or more basic blocks, (ii) aggregating one or more representations associated with each instruction sequence of the one or more basic blocks, and (iii) comparing each of the one or more aggregated representations to a plurality of instruction sequences being monitored as being potentially malicious to produce a result, the result corresponding to the object fingerprint;
classification logic that, when executed by the one or more hardware processors, analyzes the object fingerprint by at least comparing the object fingerprint to one or more malware family fingerprints to determine whether the object is potentially malicious; and
logic that, when executed by the one or more hardware processors, generates information resulting from analysis of the object fingerprint by the classification logic, for transmission from the network device to a second network device.

32. The network device of claim 31, wherein the information for transmission includes a report based on the analyzing of the object fingerprint, the report includes one or more of (i) a source of the object, (ii) a probability of the object being malicious or benign, or (iii) a known malicious family to which the object pertains.

33. The network device of claim 31, wherein the information for transmission comprises includes an alert including one or more messages to warn of detection of the object as a malicious object.

34. The network device of claim 31, wherein the aggregation logic arranges the extracted content by at least arranging the first plurality of instructions in accordance with an operational flow of the object, the operational flow is determined from an analysis of an order of execution of the first plurality of instructions without execution of the first plurality of instructions; and
segmenting the first plurality of instructions arranged in accordance with the operational flow into the one or more basic blocks,
wherein each instruction for each basic block of the one or more basic blocks completes operation without a change in control flow.

35. The network device of claim 31, wherein the aggregation logic arranges the extracted content to at least generate an object control graph including the one or more basic blocks.

36. The network device of claim 35, wherein the aggregation logic to generate the object control graph by at least
arranging the first plurality of instructions in accordance with a determined order that is based, at least in part, on an order of execution of the first plurality of instructions without execution of the first plurality of instructions; and
segmenting the first plurality of instructions arranged in accordance with the determined order into the one or more basic blocks,
wherein instruction for each instruction sequence of the one or more basic blocks completes operation without a change in control flow.

37. The network device of claim 31, wherein each instruction of the instruction sequence completes operation without a change in control flow.

38. The network device of claim 31, wherein the fingerprint generation logic to generate the representation of each instruction sequence of the one or more basic blocks by at least generating a first representation of a first instruction sequence that includes a selected number of instructions, the first instruction sequence included as a first block of the one or more basic blocks, the first representation corresponds to a hash result produced by performing a hash operation on the first instruction sequence.

39. The network device of claim 31, wherein the fingerprint generation logic to further generate the representation of each instruction sequence of the one or more basic blocks by at least
generating a first representation of a first subset of a second instruction sequence of a second basic block of the one or more basic blocks; and
generating a second representation of a second subset of the second instruction sequence,
wherein the first subset of the second instruction sequence differs from the second subset of the second instruction sequence and the first subset of the second instruction sequence sharing at least one instruction with the second subset of the second instruction sequence.

40. The network device of claim 39, wherein the first subset of the second instruction sequence and the second subset of the second instruction sequence are selected through a sliding analysis window having a width corresponding to the selected number of instructions.

* * * * *